US008563621B2

(12) United States Patent
Lapierre

(10) Patent No.: US 8,563,621 B2
(45) Date of Patent: Oct. 22, 2013

(54) BLOWING AGENTS FORMED FROM NANOPARTICLES OF CARBONATES

(75) Inventor: Renee M. Lapierre, Plantsville, CT (US)

(73) Assignee: Polyfil Corporation, Rockaway, NJ (US)

( * ) Notice: Subject to any disclaimer, the term of this patent is extended or adjusted under 35 U.S.C. 154(b) by 253 days.

(21) Appl. No.: 12/662,510

(22) Filed: Apr. 21, 2010

(65) Prior Publication Data

US 2011/0263734 A1  Oct. 27, 2011

(51) Int. Cl.
*C08J 9/08* (2006.01)

(52) U.S. Cl.
CPC .................................. *C08J 9/08* (2013.01)
USPC ............... 521/92; 521/93; 521/97; 521/143; 521/146

(58) Field of Classification Search
USPC ...................................... 521/92, 97
See application file for complete search history.

(56) References Cited

U.S. PATENT DOCUMENTS

| | | | |
|---|---|---|---|
| 4,331,619 A * | 5/1982 | Chung et al. .................. 264/13 |
| 4,347,326 A | 8/1982 | Iwami et al. |
| 5,116,881 A * | 5/1992 | Park et al. ..................... 521/143 |
| 5,342,858 A * | 8/1994 | Litchholt et al. ................ 521/98 |
| 5,366,675 A * | 11/1994 | Needham .................... 264/45.5 |
| 6,139,945 A * | 10/2000 | Krejchi et al. ............. 428/317.9 |
| 6,177,036 B1 * | 1/2001 | Van Der Hoeven et al. . 264/45.9 |
| 6,231,942 B1 | 5/2001 | Blizard et al. |
| 6,258,863 B1 * | 7/2001 | Harfmann et al. ............. 521/81 |
| 6,602,063 B1 | 8/2003 | Cardona |
| 6,602,064 B1 | 8/2003 | Chen et al. |
| 6,613,811 B1 | 9/2003 | Pallaver et al. |
| 6,616,434 B1 | 9/2003 | Burnham et al. |
| 6,659,757 B2 | 12/2003 | Kim et al. |
| 6,706,223 B1 | 3/2004 | Anderson et al. |
| 6,884,377 B1 | 4/2005 | Burnham et al. |
| 6,884,823 B1 | 4/2005 | Pierick et al. |
| 6,901,989 B1 | 6/2005 | Sargent et al. |
| 6,926,507 B2 | 8/2005 | Cardona et al. |
| 7,037,634 B2 | 5/2006 | Aylward et al. |
| 7,144,532 B2 | 12/2006 | Kim |
| 7,172,333 B2 | 2/2007 | Anderson et al. |
| 7,267,534 B2 | 9/2007 | Xu |
| 7,318,713 B2 | 1/2008 | Xu et al. |
| 7,361,294 B2 | 4/2008 | Pierick et al. |
| 7,364,677 B2 | 4/2008 | Vadala, Jr. et al. |
| 7,364,788 B2 | 4/2008 | Kishbaugh et al. |
| 7,585,557 B2 | 9/2009 | Aylward et al. |
| 8,137,600 B2 | 3/2012 | Pierick et al. |
| 8,162,647 B2 | 4/2012 | Kim |
| 2002/0022672 A1 | 2/2002 | Thunhorst et al. |
| 2002/0147244 A1 | 10/2002 | Kishbaugh et al. |
| 2002/0147245 A1 | 10/2002 | Kim et al. |
| 2003/0077346 A1 | 4/2003 | Boyer et al. |
| 2004/0038018 A1 | 2/2004 | Anderson et al. |
| 2004/0115418 A1 | 6/2004 | Anderson et al. |
| 2004/0185241 A1 | 9/2004 | Anderson et al. |
| 2004/0262813 A1 | 12/2004 | Pierick et al. |
| 2005/0163881 A1 | 7/2005 | Pierick et al. |
| 2005/0256215 A1 | 11/2005 | Burnham et al. |
| 2008/0187741 A1 | 8/2008 | Vadala et al. |
| 2008/0226892 A1 | 9/2008 | Kishbaugh et al. |
| 2008/0227901 A1 | 9/2008 | Lefevre et al. |
| 2010/0041537 A1 | 2/2010 | Baran, Jr. et al. |
| 2010/0086636 A1 | 4/2010 | Xu et al. |
| 2012/0177766 A1 | 7/2012 | Kim |
| 2012/0196115 A1 | 8/2012 | Choe et al. |
| 2012/0228793 A1 | 9/2012 | Lindenfelzer et al. |
| 2012/0232175 A1 | 9/2012 | Lindenfelzer et al. |

OTHER PUBLICATIONS

PlasmaChem "Calcium Carbonate Particles", 2003.*

* cited by examiner

*Primary Examiner* — Irina S Zemel
(74) *Attorney, Agent, or Firm* — Archer & Greiner, P.C.; Arnold D. Litt, Esq.

(57) ABSTRACT

The present invention relates to the preparation and use of a blowing agent in the form of of nanoparticles of an inorganic carbonate, and an acid. The acid is capable of being liquefied by heating to be reactive with the carbonate to release carbon dioxide that is useful as a blowing agent in all types of organic foams. The blowing agent, optionally pelletized in a suitable polymer carrier, is useful as a heat-activated blowing agent additive in polymer compositions.

33 Claims, No Drawings

BLOWING AGENTS FORMED FROM NANOPARTICLES OF CARBONATES

BACKGROUND OF THE DISCLOSURE

1. Field of the Disclosure

The present disclosure relates to a blowing agent in the form of a solid mixture of an inorganic powder, more particularly nanoparticles of an inorganic carbonate, and an acid. The acid is capable of being liquefied by heating to be reactive with the carbonate to release carbon dioxide that is useful as a blowing agent in all types of organic foams. The solid mixture, optionally pelletized in a suitable polymer carrier, is useful as a heat-activated blowing agent additive in polymer compositions.

2. Description of the Related Art

Lower cost bicarbonates which generate $CO_2$ are employed as blowing agents, but the results achieved during their thermal decomposition are relatively unpredictable, and therefore they are not usually employed to produce high quality polymer foam parts having evenly distributed porosity and aesthetic appeal.

A wide variety of compounding and blending methods are well-known and commonly used in the art and most may be adapted to mix and compound with the components of foamable polyolefin or polystyrene formulations disclosed herein. Modifying components that are not thermally sensitive, whether in powder, pellet, or other suitable form, may be mixed and melt compounded using a high shear mixer, e.g., a twin-screw extruder at temperatures effective to render the resinous components molten and obtain a desirably uniform blend. Thermally sensitive components of the formulations, including blowing agents, may be physically mixed with the resin in powder or pellet form using conventional dry-blending methods just prior to feeding the mixture to the extruder.

In a typical method for combining inorganic powder blowing agents and polymers, the powder and polymer are dropped through a feed tube into the feed barrel near the starting end of an extruder or into a "side stuffer" part-way along the extruder's length. The combined powders and polymers are compounded and extruded. In another typical method for combining inorganic powders and polymers, the inorganic powder can be dropped with the polymer into the cavity of a rotational blender such as a Banbury® mixer. The relative quantities of the polymer(s), blowing agent(s) and other additives, as well as the temperature and the manner in which pressure is reduced, will tend to affect the qualities and properties of the resulting foam product.

Conventional blowing agents produce foams that contain cells that have a negative impact upon the structural strength and appearance of the foamed product. It is desirable to produce thermoformed foamed products that are aesthetically pleasing, have a high degree of porosity and a smooth surface, and are lightweight while maintaining structural strength. Such products would be environmentally and ecologically desirable as these products require a comparatively reduced amount of resin in the production of the finished product.

OBJECTS OF THE INVENTION

In accordance with the foregoing, it is an object of the present invention to provide two component blowing agents for thermally processed foamable polymers that are predictable and stable and have extended batch life, that do not discolor polymers into which they are incorporated, and that are not susceptible to post-blow that may cause recycling problems or finished part post-treatment problems such as paint blistering.

It is a further object of the invention to provide blowing agents that do not contain by-products that can either cause polymer degradation or are prone to plating out on the internal surfaces of processing equipment.

It is a further object of the invention to provide blowing agents that produce extremely lightweight, low density foams having voids of up to 90% and having smooth, uniform surfaces while reducing the carbon footprint of the finished foam product.

It is a further object of the invention to produce nanosized particles of blowing agents capable of producing desired characteristics of small pore size, uniform pore distribution in the final foam product.

SUMMARY OF THE DISCLOSURE

The present invention relates to a mixture of nanoparticles of inorganic, preferably an alkaline earth metal carbonate and a reactive acid; and its use as a blowing agent in the production of microcellular foams having outstanding structural and ecological properties. The reactive acid is preferably solid and upon addition to a foamable polymer is heated above the melting point of the acid, liquefies and reacts with the nanosized alkaline earth metal carbonate to release the carbon dioxide to act as a blowing agent. The blowing agent can be used as a singular component additive or as a pelletized additive admixed in any suitable polymeric carrier, such as polyethylene or other polymers that are compatible when blended with the thermoplastic or thermoset material to be foamed.

DETAILED DESCRIPTION OF THE DISCLOSURE

The blowing compounds of the present invention contain a mixture of nanoparticles of an alkaline earth metal carbonate and a reactive acid. These blowing compounds or agents are used in the production of microcellular foams having outstanding structural and ecological properties. The reactive acid is preferably solid and upon addition to a foamable polymer is heated above the melting point of the acid, liquefies and reacts with the nanosized alkaline earth metal carbonate to release the carbon dioxide to act as a blowing agent.

The term "nanoparticles" is therefore intended to denote particles with a particle size of less than or equal to 500 nm and greater than or equal to 1.0 nm. The particle size is measured by one of the following methods: X-ray diffraction (XRD line broadening) technique, Centrifugal liquid Sedimentation (Standard ISO 13318-2, 2001), small-angle X-ray scattering (SAXS), Dynamic Light Scattering (standard ISO-DIS 22412, 2006) or air permeation (Lea and Nurse® method, Standard NFX 11-601, 1974).

Alkaline earth metal carbonates for use in the present invention include calcium carbonate, magnesium carbonate, barium carbonate and the like or mixtures thereof. The preferred carbonate is calcium carbonate due to its cost and availability. The alkaline earth metal carbonate is nanosized by conventional techniques to have an average nanoparticle size of less than or equal to 500 nanometers (0.5 microns) and greater than or equal to 1.0 nanometers (0.001 microns), preferably 100 nanometers (0.1 microns) or less, most preferably 80 nanometers (0.08 microns) or less.

The acids for use in the production of the blowing agent are acids or salts thereof that are solid and inert at room temperature and have a melting temperature below the melt processing temperature of the material to be foamed. For example, citric acid (3-carboxy-3-hydroxy pentanedioic acid) has a melting point of 153° C. while polystyrene has a melting point of 240° C. When pre-blended with the carbonate, any acid or salts thereof is useful in the present invention that is: (a) solid and inert or nonreactive with the carbonate at room temperature, (b) has a melting temperature below the melt processing temperature of the material to be foamed, and (c) is reactive when liquefied with an alkaline earth metal carbonate to release $CO_2$. Acids and their corresponding salts that are useful in the present invention include but not limited to: acetic acid, ascorbic acid, boric acid, butanoic acid, carbonic acid, citric acid, chromic acid, formic acid, heptanoic acid, hexanoic acid, hydrocyanic acid, hydrofluoric acid, lactic acid, nitrous acid, octanoic acid, oxalic acid, pentanoic acid, phosphoric acid, propanoic acid, sulfurous acid and uric acid. Weak acids such as sodium citrate and citric acid are preferred for use in the invention The alkaline earth metal carbonate and reactive acid are used in an approximate equimolar ratio although it may be desirable to utilize an excess amount of reactive acid to ensure total reactive release of the carbon dioxide from the alkaline earth metal carbonate. The blowing agent systems of the present invention provide excellent gas yields, ordinarily in the 150-300 cc/gm range.

The mixture of the alkaline earth metal carbonate and the acid can be used as a blowing agent additive without a carrier by directly mixing the blowing agent or its individual components into a polymer composition to be foamed using conventional mixing techniques. If the alkaline earth metal carbonate and acid are added together as a mixture both components are solid prior to mixing. If the alkaline earth metal carbonate and reactive acid are added separately the acid may be added in liquid or solid form.

In a preferred embodiment the blowing agent is mixed with a suitable carrier to form a pelletized additive. Suitable carriers are typically any polymer or copolymer that is compatible for blending into the polymeric materials to be foamed without adversely affecting any of the desired characteristics of the final foamed product. Typical carriers include but are not limited to polyolefins, preferably polyethylene or suitable copolymers thereof.

The blowing agent can be used as an additive or as a pelletized additive admixed in any suitable polymeric carrier, such as polyethylene or other polyolefins, that are compatible when blended with the polymer to be foamed. The polymeric carrier must not have properties that deleteriously affect the desired properties of the foamed polymer. The blowing agent must be admixed or encapsulated in a polymeric carrier at a temperature lower than the melting point of the solid reactive acid. When a carrier is used, the acid must have a melting point that is higher than the melting point of the polymeric carrier. The blowing agent is typically mixed with a carrier in weight ratio range of 3:97 to 70:30; preferably 60:40 to 40:60.

The blowing agent can be used as a blowing agent for any polymer capable of being foamed. Suitable polymers for foaming include but are not limited to polymers or copolymers formed from one or more olefin, styrene, acrylate or urethane monomers and mixtures thereof. Preferable polymers for foaming in the present invention include TPO, TPE, polyolefins, polystyrene, PET, polyurethane and polyacrylate.

The blowing agent is used as an additive to the polymer to be foamed in amounts typically ranging from 0.05 to 5% by weight, preferably 0.1 to 2% by weight, most preferably 0.3 to 1% by weight of the final foamed polymer.

By utilizing the carbonate nanoparticles of the present invention it is possible to produce lightweight polymeric foams that retain their desirable physical properties such as tensile strength and in injection molding it reduces molded-in stresses equating to improved impact properties. The foamed product displays pleasing visual characteristics such as a smooth, even-colored surface as opposed to conventional foams that often display evidence of swirling and discoloration. Furthermore the use of the carbonate nanoparticles of the present invention permits the preparation of foams having a total void space of up to 80 to 90%, thereby utilizing a smaller amount of polymer in the final product. The produced foams are generally closed cell foams having pore sizes ranging from 30 to 150 microns preferably 50 to 90 microns.

The blowing agents of the present invention, being pelletized or free-flowing, stable and easily handleable, require no special coatings or adjuncts, such as accelerators, in order to perform their intended functions. In employing these compounds, they are simply mixed together with other batch ingredients employing the standard mixing procedures normally required for the particular thermoplastic or thermoset material. Due to their exceptional stability, batches of the blowing agents may be prepared far in advance of the actual finished processing required without fear of degradation or loss of consistency as long as the mixture is maintained below the melting temperature of the acid.

Foamable Polymers:

The melt-processable polymers that are useful with the blowing agent containing nanosized inorganic carbonates of this disclosure are generally high molecular weight polymers.

Polymers particularly useful in this disclosure are high molecular weight melt processable polymers. By "high molecular weight" it is meant to describe polymers having a melt index value of 0.01 to 50, typically from 2 to 10 as measured by ASTM method D1238-98. By "melt-processable," it is meant to describe a polymer that can be extruded or otherwise converted into shaped articles through a stage that involves obtaining the polymer in a molten state.

Many foamable thermoplastic and thermosetting masses can be advantageously expanded by means of the blowing agents in accordance with the practice of the present invention. Foamable polymers which are suitable for use in this disclosure include, by way of example but not limited thereto, polymers of ethylenically unsaturated monomers including olefins such as polyethylene, polypropylene, polybutylene, and copolymers of ethylene with higher olefins such as alpha olefins containing 4 to 10 carbon atoms or vinyl acetate; polyethylene terephthalates (PET); polyethylene nitriles (PEN); vinyls such as polyvinyl chloride, polyvinyl esters such as polyvinyl acetate, polystyrene, acrylic homopolymers and copolymers; phenolics; alkyds; amino resins; epoxy resins, polyamides, polyurethanes; phenoxy resins, polysulfones; polycarbonates; polyesters and chlorinated polyesters; polyethers; acetal resins; polyimides; and polyoxyethylenes. Mixtures of polymers are also contemplated. Preferable foamable polymers include: various polyolefins such as polymers and copolymers of ethylene and propylene in high or low density versions and in generally linear or cross-linked forms; polystyrene and other polymers and copolymers of various alkenyl aromatic monomers such as styrene/acrylonitrile copolymers and ABS-type resins; vinyl chloride polymers and copolymers; and numerous other thermoplastic resinous materials capable of being expanded into structural foam products or low density expanded plastic article materials.

Preparation of the Polymer Composition

The melt-processable polymer is usually available in the form of powder, granules, pellets or cubes. Methods for dry blending include shaking in a bag or tumbling in a closed container. Other methods include blending using agitators or paddles. The blowing agent and melt-processable polymer may be co-fed using screw devices, which mix the blowing agent and melt-processable polymer together before the polymer reaches a molten state. Alternately, the components may be fed separately into equipment where they may be melt blended, using any methods known in the art, including screw feeders, kneaders, high shear mixers, blending mixers, and the like. Typical methods use Banbury® mixers, single and twin screw extruders, and hybrid continuous mixers.

A foam composition of the present invention can be formed by mixing nanoparticles of an alkaline earth metal carbonate and an acid at a temperature below the decomposition temperature of the acid with an unfoamed polymer to form a prefoamed mixture. The temperature of the prefoamed mixture is then heated above both the melting temperature of the unfoamed polymer and the melting temperature of the acid. The liquid acid reacts with the alkaline earth metal carbonate to release carbon dioxide in amounts suitable to produce foaming in the unfoamed polymer. The mixture is maintained at suitable foaming conditions to form a viscous foamed polymer. The foamed polymer is cooled into a solid and recovered.

Processing temperatures depend on the polymer and the blending method used, and is well known to those skilled in the art. The intensity of mixing depends on the polymer characteristics.

The primary benefit of using the blowing agent of the invention is to control cell size and cell distribution pattern of the produced foams. The compositions of this invention are useful for such applications as formed articles, smooth surfaced articles receptive to writing, resilient packaging materials, and the like.

Having now generally described the invention, further understanding thereof can be achieved by reference to the appended Examples which are provided herein for purposes of illustration of modes of practicing various aspects of this invention only and are not intended to be limiting in any manner. These examples display the use of the blowing agent of the present invention in the production of uniform small cell foams.

Example 1

A blowing agent containing 4.8 grams of $CaCO_3$ (Socal 322™) having an average particle size of 0.08 microns (80 nanometers) with 3.6 grams of sodium citrate (powder) was added to 1000 grams of low density polyethylene at room temperature. The mixture was hand blended in a polyethylene bag (how blended) and heated to 419° F. under a pressure of 1270 PSI to produce a foam piece. The foam piece examined under a microscope showed an even distribution of relatively uniform cells averaging 60 microns and had a density of approximately 48 lb/cu ft.

Comparative Example 1

A blowing agent containing 4.8 grams of $CaCO_3$ having an average particle size of 1.5 microns with 3.6 grams of sodium citrate was added to 1000 grams of low density polyethylene. The mixture was processed under the same conditions as Example 1 to produce a foam piece. The foam piece showed uneven distribution of cells of having an average cell size of 683 microns and had a density of approximately 48 lb/cu ft.

As displayed in Example 1, the process of the present invention is useful in the production of foams having even distribution of relatively uniform cells averaging 60 microns in size. In Comparative Example 1, the use of convention sized $CaCO_3$ particle produced foam having an uneven distribution of cells averaging over ten times the average pore size produced in accordance with the present invention.

The foregoing description is for purposes of illustration only and is not intended to limit the scope of the protection accorded this invention. The scope of protection is to be measured by the following claims, which should be interpreted as broadly as the inventive contribution permits.

The invention claimed is:

1. A foaming agent for foaming a polymer comprising a mixture of nanoparticles of an alkaline earth metal carbonate with an average diameter of less than or equal to 0.7 microns, and an acid salt derived from weak acids and wherein the acid salts are selected from the group consisting of alkaline metal acid salts, said acid salt when liquefied being capable of reacting with said alkaline earth metal carbonate resulting in the release of carbon dioxide and forming a foamed polymer.

2. The foaming agent in claim 1 wherein said polymer is a polyolefin.

3. The foaming agent in claim 1 wherein the nanoparticles of the alkaline earth metal carbonate have an average diameter of less than 0.1 microns.

4. The foaming agent in claim 1 wherein the nanoparticles of the alkaline earth metal carbonate have an average diameter of less than 0.08 microns.

5. A method of preparing a foamed polymer utilizing a foaming agent for foaming a polymer and resulting in a foamed polymer of small pore size comprising the steps of:
   a) mixing a pellet comprising an alkaline earth metal carbonate, in the form of nanoparticles having an average diameter of less than or equal to 0.7 microns and an acid salt in a carrier with an unfoamed polymer to form a prefoamed mixture, and wherein the acid salt comprises an alkaline metal acid salt;
   b) maintaining the temperature of the prefoamed mixture above both the melting temperature of the foamed polymer and the melting temperature of the carrier and the acid salt thereby reacting the acid salt with the alkaline earth metal carbonate resulting in the release of carbon dioxide;
   c) maintaining the mixture at suitable foaming conditions to form a viscous foamed polymer;
   d) cooling the foamed polymer into a solid and
   e) recovering a solid foamed polymer.

6. The method as defined in claim 5 wherein the alkaline earth metal carbonate is $CaCO_3$.

7. The method as defined in claim 5 wherein the carrier is polyethylene.

8. A method of preparing a solid foamed polymer utilizing a foaming agent comprising the steps of:
   a) mixing nanoparticles of an alkaline earth metal carbonate having an average diameter of less than or equal to 0.7 microns and an acid salt capable of reacting with said alkali earth metal carbonate to release carbon dioxide into an unfoamed polymer to form a mixture, said acid salt comprising an alkaline metal salt,
   b) maintaining the mixture at suitable foaming conditions wherein the alkaline earth metal carbonate and the acid or salt thereof react resulting in the release of carbon dioxide to form a viscous foamed polymer,
   c) cooling the foamed polymer into a solid and
   d) recovering a solid foamed polymer.

9. The method as defined in claim 8 wherein the alkaline earth metal carbonate is CaCO$_3$.

10. The method as defined in claim 5 wherein the solid foamed polymer has pore sizes ranging from 30 to 150 microns.

11. The foaming agent of claim 1 wherein the alkaline earth metal carbonate consists of CaCO$_3$.

12. The foaming agent of claim 1 wherein the acid salt consists of sodium citrate.

13. The foaming agent of claim 1 wherein the acid salt consists of monosodium citrate.

14. The foaming agent of claim 1 wherein the foamed polymer possesses pore sizes ranging from 30 to 150 microns.

15. The foaming agent of claim 1 wherein the foamed polymer possesses a pore size ranging between 50 to 90 microns.

16. The foaming agent of claim 1 wherein the alkaline earth metal carbonate is selected from the group comprising calcium carbonate, magnesium carbonate, barium carbonate and mixtures thereof.

17. The foaming agent of claim 1 wherein the alkaline earth metal carbonate has an average diameter equal to or less than 0.5 microns.

18. The method as defined in claim 5 wherein the acid salt is selected from the group consisting of sodium citrate and monosodium citrate.

19. The method of claim 5 wherein the alkaline earth metal carbonate is selected from the group comprising calcium carbonate, magnesium carbonate, barium carbonate and mixtures thereof.

20. The method as defined in claim 5 wherein the alkaline earth metal carbonate has an average diameter equal to or less than 0.1 microns.

21. The method of claim 5 wherein the foamed polymer has pore sizes ranging between 50 to 90 microns.

22. The method as defined in claim 8 wherein the acid salt is selected from the group consisting of sodium citrate and monosodium citrate.

23. The method as defined in claim 8 wherein the foamed polymer has a pore size ranging from 50 to 90 microns.

24. The method as defined in claim 9 wherein the nanoparticles of calcium carbonate have an average diameter of less than or equal to 0.5 microns.

25. The method as defined in claim 9 wherein the nanoparticles of calcium carbonate have an average diameter of 0.1 micron.

26. The foaming agent of claim 11 wherein the acid salt is monosodium citrate.

27. The foaming agent of claim 13 wherein the foamed polymer has a pore sizes ranging between 30 to 150 microns.

28. The foaming agent of claim 13 wherein the foamed polymer has a pore sizes ranging between 50 to-90 microns.

29. The foaming agent of claim 13 characterized by void spaces of up to 90%.

30. The foaming agent of claim 15 wherein the foamed polymer has void spaces of up to 90%.

31. The foaming agent of claim 1 wherein the polymer is polystyrene.

32. The foaming agent of claim 5 wherein the polymer is polystyrene.

33. The foaming agent of claim 8 wherein the polymer is polystyrene.

\* \* \* \* \*